(No Model.)
J. F. THEURER.
STEEPING TANK FOR BREWERIES, &c.
No. 437,910. Patented Oct. 7, 1890.
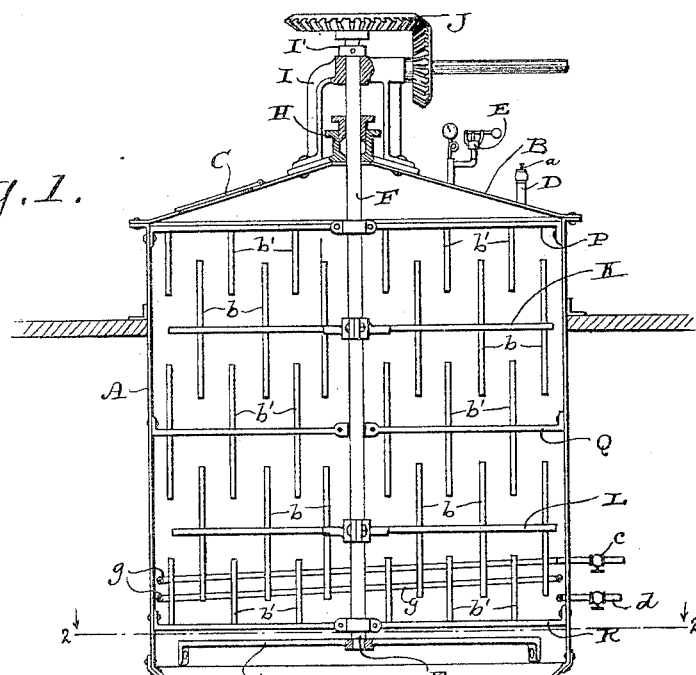
Fig. 1.
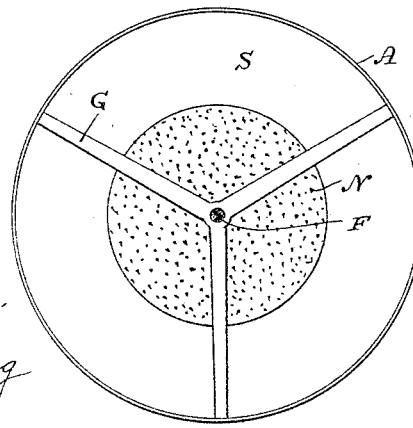
Fig. 3.
Fig. 2.
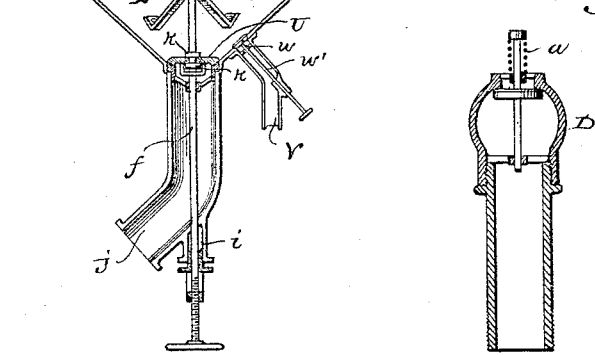
Witnesses
Geo. W. Young.
William Klug.
Inventor
Jacob F. Theurer
By Stout & Underwood
Attorneys

UNITED STATES PATENT OFFICE.

JACOB F. THEURER, OF MILWAUKEE, WISCONSIN.

STEEPING-TANK FOR BREWERIES, &c.

SPECIFICATION forming part of Letters Patent No. 437,910, dated October 7, 1890.

Application filed April 29, 1889. Serial No. 308,929. (No model.)

*To all whom it may concern:*

Be it known that I, JACOB F. THEURER, of Milwaukee, in the county of Milwaukee, and in the State of Wisconsin, have invented certain new and useful Improvements in Steeping-Tanks for Breweries, &c.; and I do hereby declare that the following is a full, clear, and exact description thereof.

My invention relates to tanks for steeping hops, and will be fully described hereinafter.

In the drawings, Figure 1 is a vertical section through the center of my apparatus. Fig. 2 is a section on line 2 2 of Fig. 1, and Fig. 3 is a section of the outlet-valve of the tank.

A is the steeping-tank, which is preferably hung through one of the floors of the building, as shown. The top B of this tank is preferably inclined, and has a feed-opening which is closed by a hinged door C, that may be locked tight in its seat by any suitable means.

D is a tube that contains a valve that is closed by a spiral spring $a$ from the outside, which permits it to open to let in air when the contents of the tank are being withdrawn from below.

E is a safety-valve, that permits the escape of steam after a certain predetermined pressure in the tank.

F is a shaft that is stepped at is lower end in a spider G and at its upper end has a bearing in a stuffing-box H and spider I, a collar I' also forming a partial support for said shaft. A bevel gear-wheel J is keyed on the upper end of this shaft and serves to connect it with a suitable driving-power.

Inside of the tank the shaft F carries two horizontal arms K and L. The arms K and L are just alike, each carrying vertical fingers $b$. Between the top and bottom of the tank braces P, Q, and R are extended across the tank, and these braces are each provided with fingers $b'$, and the fingers of arms K and L are adapted to pass between the fingers of braces P, Q, and R, respectively.

A steam-pipe $g$ is coiled around the inside of the tank near the bottom, $c$ being the inlet and $d$ the exhaust. S is the solid bottom of the tank, and this bottom is inclined down to an opening that forms a seat for a valve U, the stem $f$ of which passes down through a bushing $i$ in an outlet-pipe $j$. The valve U is secured to its stem by a pair of collars $k\ k$, and from these collars the stem $f$ projects up through the hub of a spider $k'$ to the apex of a perforated cone N, that forms a false bottom for the tank. This cone is braced to the stem $f$ by a spider $m$, and its edges rest upon the inclined sides of the tank when the valve is down; but when the valve is raised the cone also is lifted out of contact with the bottom of the tank to permit the solid contents thereof to drop through the outlet-pipe $j$.

The liquid contents of the tank A are drawn off through an angle-pipe V, which is normally closed by a valve $w$, the stem $w'$ of which is bushed in an angle of pipe V; but when the solid contents are to be drawn off the valve U is lifted, and thus the cone N is raised to allow the solid matter to drop through pipe $j$. If desirable, the spider G may be omitted, as the collar I' will usually form a sufficient support for the shaft F.

I lay no claim in this application to the described specific arrangement of the stirrer-arms and braces, such being included in another application filed by me on July 25, 1890, under Serial No. 359,920.

Having thus fully described my invention, what I claim as new, and desire to secure by Letters Patent, is—

In a steeping-tank for breweries, &c., the combination, with a receptacle having an inclined bottom and outlets therein for liquid and solid matter, of a valve located within the liquid-outlet, a valve located in the outlet for solid matter and having a stem, and a perforated cone-plate attached to the upper end of said stem and arranged to seat itself upon the inclined bottom above the outlets for liquid and solid matter, substantially as described.

In testimony that I claim the foregoing I have hereunto set my hand, at Milwaukee, in the county of Milwaukee and State of Wisconsin, in the presence of two witnesses.

JACOB F. THEURER.

Witnesses:
S. S. STOUT,
WILLIAM KLUG.